March 16, 1937.  C. L. EKSERGIAN  2,073,924

METHOD OF MAKING A WHEEL

Filed May 1, 1934

INVENTOR.
Carolus L. Eksergian.
BY
ATTORNEY.

Patented Mar. 16, 1937

2,073,924

UNITED STATES PATENT OFFICE 2,073,924

METHOD OF MAKING A WHEEL

Carolus L. Eksergian, Detroit, Mich., assignor to Budd Wheel Company, Philadelphia, Pa., a corporation of Pennsylvania Application May 1, 1934, Serial No. 723,306

3 Claims. (Cl. 29—159.03)

My invention relates to wheels and particularly to sheet-metal wheels for automobiles and other vehicles.

One object of my invention is to provide a simplified method of fabricating and assembling a vehicle wheel of a particular type embodying complementary front and rear body elements which form a composite hollow body.

Another object of my invention is to provide a wheel that shall not only facilitate the above-mentioned method but that shall have advantages whether the wheel is constructed by this method or not.

Another object of my invention is to provide a wheel that shall be of light weight without sacrificing necessary strength, simple and durable in construction, adapted to facilitate welding of its parts, economical to manufacture, ornamental in appearance, and effective in its operation, as well as to have other advantages incident thereto.

Figure 1:
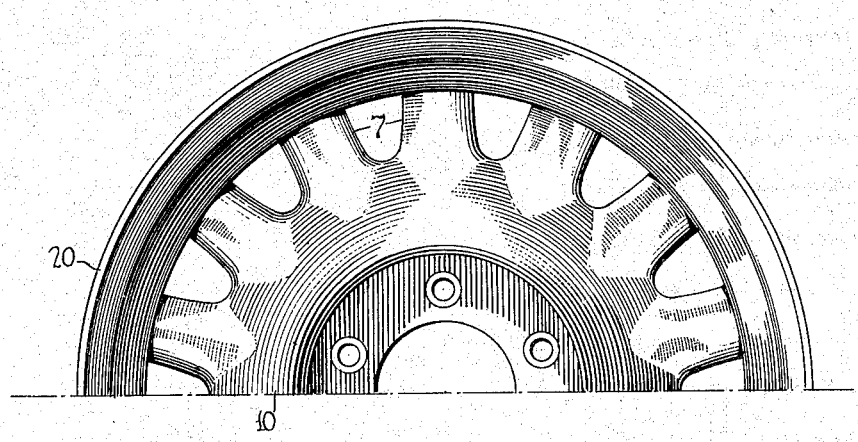
Figures 2, 3:
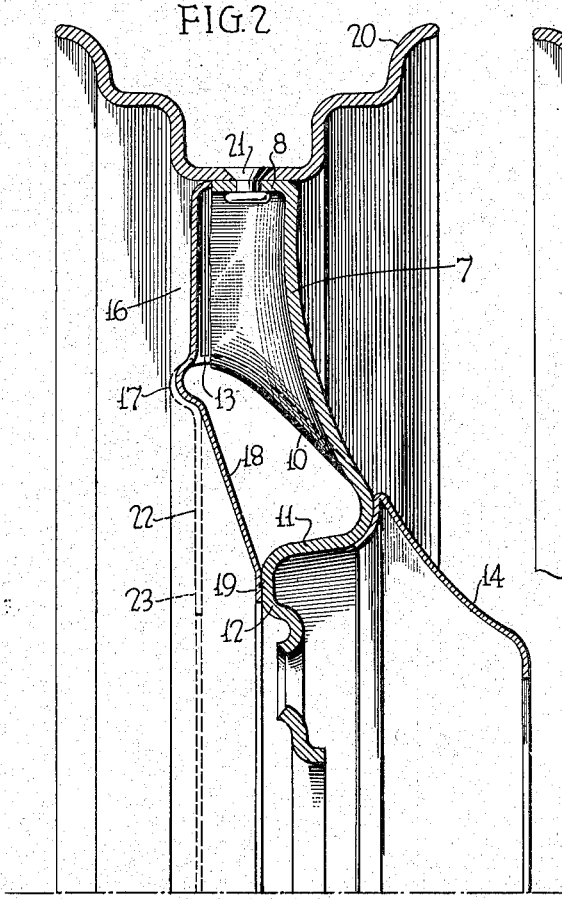

The construction, the method of fabrication and assembly, and the advantages appertaining thereto will be made apparent from the following description and the accompanying drawing, in which, Figure 1 is a view, in front elevation, of one half of an artillery wheel constructed in accordance with the invention, Figure 2 is an enlarged view, in axial section through one of the spokes, of the structure shown in Figure 1, and Figure 3 is a view similar to a portion of Figure 2, of a variation of structure of a wheel embodying the invention.

Referring to Figs. 1 and 2, a front spider, preferably of relatively heavy gauge stainless sheet steel, has rear opening channel spokes 7, closed at the outer ends by elements or end portions 8, a conical nave 10 and a radially inner mounting plate portion having a substantially wheel plane surface 12. A thin gauge hub shell or cap 14 of any suitable construction, is provided at a position at the front of the wheel.

A rear spider, preferably of thin gauge resilient sheet metal, embodies spoke or leg portions 16 having forwardly turned edges conforming, and preferably flash welded, to the front spoke portion 7 to provide composite tubular spokes of smooth rounded contour, an annular bead 17 of channel section adjacent to the spokes, a forwardly sloping portion 18 and a wheel plane portion 19 preferably spot welded to the surface 12 of the front spider.

A drop center or other form rim 20 is secured to the portions 8, as by rivets 21, by welding or other means.

In fabricating the rear spider, its parts 17 and 19 are so shaped and conditioned, relative to the other parts thereof, that, when placed next to the front spider, these parts respectively occupy positions 22 and 23, indicated by dotted lines in Fig. 2.

In these positions, a space is provided radially inwardly of the spiders such that, after the spoke portions of the spiders have been welded together, a backing plate or tool may be thrust radially outwardly through the spokes to effect upsetting of the rivets 21. A welding tool or other implement could likewise be employed. It is thus possible to secure the inner portion of the wheel including the nave and spokes as a unit to the rim, thereby avoiding warping of the parts without the necessity for elaborate jigs or other means for holding the parts during assembling.

After such operation, the parts 17 and 19 are bent or pressed forwardly to the full line positions, whereby to form, with the nave 10, and the portion 11 a closed hollow annulus.

Having the bead 17 adjacent to the spokes, or near the outer limits of the above-mentioned hollow annulus, not only facilitates the above-described assembly operation, by permitting easy bending of the parts radially inwardly thereof, but also, as a structural feature, compensates for any relative weaving, caused by axial wheel thrust or radial yield, to reduce any strains on the welded joints between the spiders. Having the parts 19 and 12 in broadside wheel plane relation facilitates spot welding by axially-directed welding electrodes, and simplifies die shapes and drawing.

The structure of Fig. 3 is similar to that of Figs. 1 and 2, excepting that, instead of having forwardly turned edges 13 on the rear spider legs, the latter are flat wheel plane portions spot or otherwise welded broadside against the relatively expansive rear edges of the heavy gauge front spider spokes.

Although I have shown and described particular methods and forms embodying this invention, changes may be effected therein without departing from the generic spirit and scope thereof set forth in the appended claims.

What I claim is:

1. In a process for making a wheel including complementary spiders providing tubular spokes and a hollow nave radially inwardly thereof, the method of fabrication and assembly which comprises forming the inner portion of the annulus of one of said spiders to stand away from the annulus of the other spider, when assembled to provide an opening into the hollow nave and tubular spokes in securing a rim to the spokes by an operation including the extension of an element or elements radially outwardly through the spokes, and in bending said inner portion against the other spider and securing it thereto, thereby closing the opening.

2. The method according to claim 1 including the step of forming an annular bead in the part of the annulus to be bent by displacing from the main body portions thereof.

3. In a process for making a wheel including complementary spiders providing tubular spokes and a hollow nave radially inwardly thereof, the method of fabrication and assembly which comprises forming the inner portion of the annulus of one of said spiders to stand away from the annulus of the other spider when assembled to provide an opening into the hollow nave and tubular spokes, in effecting an operation through said opening and in finally bending said inner portion against the other spider and securing it thereto, thereby closing said opening.

CAROLUS L. EKSERGIAN.